Nov. 10, 1959 — B. S. O. ALMÉN — 2,911,707
TOOL HOLDER
Filed Aug. 2, 1957 — 2 Sheets-Sheet 1
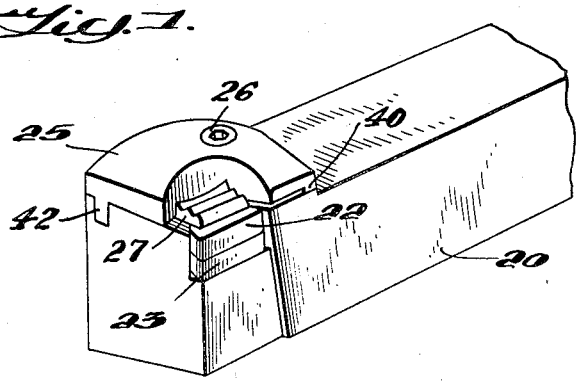
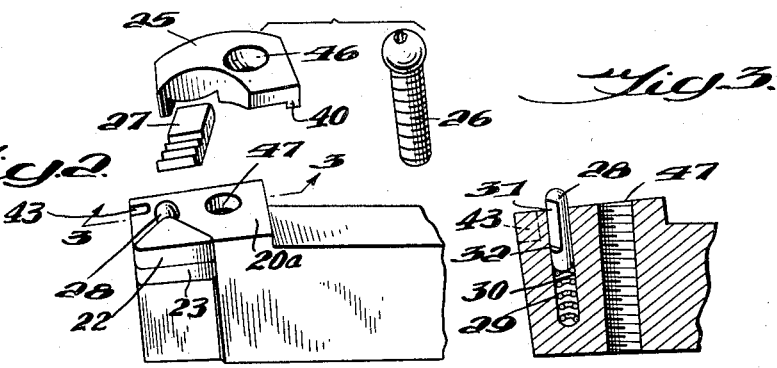
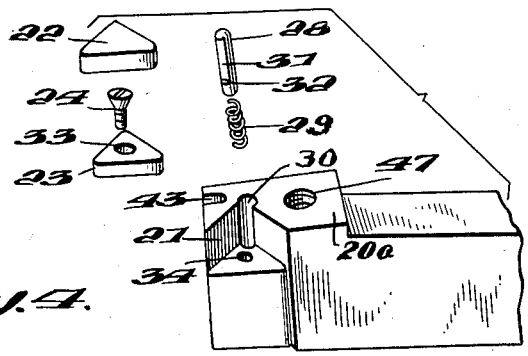
INVENTOR
Bengt Sven Olof Almén
BY Pierce, Scheffler & Parker
ATTORNEYS

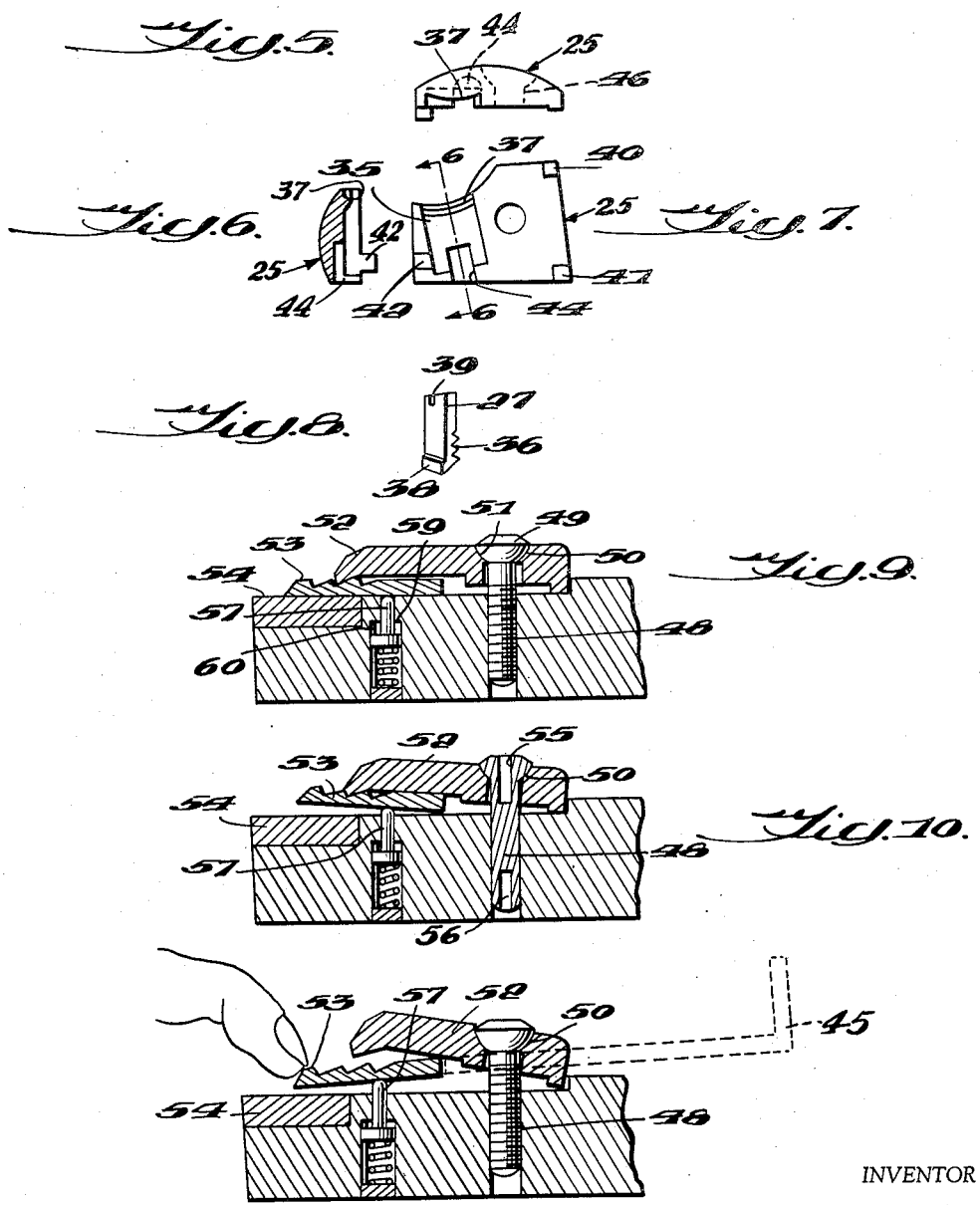

United States Patent Office 2,911,707
Patented Nov. 10, 1959

2,911,707

TOOL HOLDER

Bengt Sven Olof Almén, Sandviken, Sweden, assignor to Sandvikens Jernverks Aktiebolag, Sandviken, Sweden, a corporation of Sweden Application August 2, 1957, Serial No. 675,974

5 Claims. (Cl. 29—96)

This invention relates generally to tool holders and more particularly to tool holders of a type provided with separate, loosenable chip breakers arranged to be clamped to the tool holder.

Tool holders particularly adapted for chip cutting machining are usually provided with a tool bit of sintered hard metal, ceramic material loosenably clamped in a recess in the holder shank. The tool bit may have the form of a plate having a rectangular square, cylindrical or triangular form and is generally held to the holder shank by means of a clamping device or the like adapted to press against its upper surface.

Chip breakers per se are common in tool holders of this general type. While separate, loosenable chip breakers are generally used which are clamped between a clamping device and the tool bit, there are sometimes also used chip breakers which are firmly fastened to the clamping device. Both of these types of chip breakers have several inherent disadvantages; a common drawback of the known constructions having separate, loosenable chip breakers is that during replacement or adjustment of the tool bit the chip breaker, which has a relatively small size, is easily dropped and lost, since during such an adjustment the chip breaker normally must be removed simultaneously with the tool bit and be subsequently reassembled. Among the drawbacks inherent in a chip breaker which is rigidly fastened to the clamping device is that in order to replace the chip breaker the whole clamping device must be replaced, which procedure is expensive and may require a relatively long replacement time.

The present invention relates to an improved construction of the tool type in question, by means of which the above mentioned and other drawbacks of the devices of the prior art are effectively eliminated. The invention includes tool holders having a separate, loosenable chip breaker arranged to be clamped between a clamping device and the tool bit. The tool bit is preferably loosenably arranged in the holder, but may naturally also be fastened to the holder by means of brazing or the like. The invention is characterized in that a resilient device is arranged to press the chip breaker against or in the direction of the clamping device. By means of the resilient device, which is preferably arranged on the tool holder adjacent the tool bit body but in certain cases may be arranged upon the clamp or clamping device of the tool holder, the chip breaker is kept in contact with the clamp or clamping device when the clamping device is loosened somewhat in order to remove the tool bit.

By this arrangement a rapid replacement of the tool bit or the adjustment of a present tool bit body to a new unused cutting edge may be made possible without affecting the chip breaker plate, and without losing the adjustment of the chip breaker. Also a rapid change of the adjustment of the chip breaker may be made possible without the chip breaker being separated from the holder.

Other objects and advantages of my invention will be apparent from a study of the following specification when considered in conjunction with the accompanying drawings in which:

Fig. 1 is a perspective view of an embodiment of the cutter holder according to the invention. Figs. 2 and 4 are perspective views of the disassembled elements of the embodiment of Fig. 1. Fig. 3 is a sectional view taken along line 3—3 in Fig. 2. Figs. 5 and 7 are side and bottom views, respectively, of the clamping member. Fig. 6 is a sectional view of the clamping device taken along line 6—6 in Fig. 7. Fig. 8 is a perspective view of the chip breaker. Figures 9–11 show in section an alternative embodiment of a tool holder in accordance with the invention.

Referring now to the embodiment shown in Figs. 1–7, the holder shank 20 is provided with a recess 21 adapted to receive a tool bit body 22 illustrated in the form of a triangular plate. The invention is, however, similarly applicable with tool bits of other configurations, as for example plates or rods, of square, circular or irregular form. The tool bit body, which preferably consists of sintered hard metal or any suitable ceramic material, is suitably supported by a supporting plate of a harder material, such as, for example, sintered hard metal, than the holder shank. The supporting plate 23 is in the illustrated embodiment removably fastened in the holder by means of a screw 24.

The cutter holder is further provided with a clamping device 25, which is loosenably fastened to the holder by means of a clamping screw 26 or the like. Between the clamping device 25 and the tool bit body 22 is removably arranged a separate, chip breaker 27. In a groove 30 in the wall of the tool holder recess 21 is arranged a resilient device, consisting of a pressure body 28 and a spring 29. The pressure body is provided with a bevelled surface 31, which terminates at its lower end in a stop 32. The pressure body 28 is so arranged within the groove 30 that its bevelled surface 31 partly cooperates with the tool kit body 22 and the supporting plate 23 for vertical guidance of the pressure body. Upward movement of the pressure body will be limited by the cooperation of the stop 32 with the lower surface of the supporting plate.

The assembling of the resilient device is effected in such a way that first the spring 29 and the pressure body 28 are brought down into the groove 30, after which the spring is pressed together by the application of pressure upon the pressure body, and the supporting plate 23 is then arranged into position. By means of the screw 24, which extends through an opening 33 in the supporting plate, and which cooperates with a threaded hole 34 in the recess 21, the supporting plate is secured to the assembly. Thus the resilient device is fixed in the recess 30 by means of the stop 32 and the supporting plate 23. The triangular-shaped tool bit 22 is then fitted in the recess 21 on top of plate 23 so that its upper surface will be substantially coplanar with the holder shank upper surface 20a as shown in Fig. 2.

As is apparent from the figures, the resiliently-mounted pressure body 28 will contact and press upwardly against the chip breaker 27 when the clamping device 25 is somewhat loosened in order that the tool bit might be adjusted angularly to present a new cutting edge or in order that a different bit might be substituted. This means that the chip breaker is prevented from falling out of the holder and becoming lost. Also the chip breaker is prevented from changing its position in relation to the clamping device. When the clamping device is loosened in the tool holder, in accordance with the invention the resilient device presses the chip breaker against the clamping device and lifts both of them upwardly with the result that unobstructed adjustment of the tool bit body is made possible.

The clamping device 25 is provided with a first groove or recess 35 adapted to receive the chip breaker. The forward portion of the groove is provided with a downwardly depending shoulder 37 adapted to engage one of the grooves 36 in the upper surface of the chip breaker.

As will be seen in Fig. 5, the shoulder 37 may be curved to have a convex configuration so that it will contact only an intermediate part of the chip breaker. The chip breaker 27 may be provided with a downwardly depending shoulder 38 (Fig. 8) at the forward portion thereof adapted to contact the upper surface of the tool bit 22 and a downwardly depending shoulder 39 at the rear portion thereof adapted to contact the upper surface 20a of the holder shank 20 and thus securely connect the chip breaker to the tool bit. The curved shoulder 37 in the recess of the clamping device provides an effective support for the chip breaker against chip pressure.

Instead of the above mentioned shoulder 37 the clamping device may be provided with grooves or the like for engagement with the corresponding grooves or the like of the chip breaker. The clamping device may further be provided with shoulders 40 and 41 for contact against the tool holder shank upper surface 20a and a guide shoulder 42 intended to be brought down into a corresponding recess 43 on the tool holder shank.

The regulation of the chip breaker adjustment is effected by partial loosening of the clamping device, the resilient device serving to keep the chip breaker in contact with the clamping device, after which the end of the chip breaker directed against the tool bit is depressed enough to enable disengagement of the grooves of the chip breaker from the corresponding shoulder of the clamping device. In doing so the chip breaker simultaneously acts as a double armed lever, the elevated end of which keeps the clamping device in fixed open position. The chip breaker may now be moved in its longitudinal direction until a second groove is brought into engagement with the shoulder 37 of the clamping device. The displacement of the chip breaker may be performed by the aid of a rod, key or the like, which is inserted through a separate second recess or groove 44, opening at the rear side of the clamping device opposite from the tool bit. In Fig. 11, which illustrates a somewhat modified embodiment, it is illustrated how a change in the position of the chip breaker may be performed by means of a key 45.

As mentioned above the clamping device 25 is suitably loosenably fastened to the holder shank 20. The fastening device may consist of a screw 26 which extends through an opening 46 in the clamping device and which cooperates with a threaded hole 47 in the holder shank. As more clearly shown in Figures 9–11, which show a section of a somewhat modified embodiment, the head 49 of the screw 48 may be formed with a spherical under portion 50, which may cooperate with a corresponding spherical opening 51 in the clamping device. By this means the clamping device 52 will be pivoted upwardly somewhat upon loosening of the screw 48 by means of the pressure device so that a substituttion of tool bit 54 and also an adjustment of the chip breaker may be readily facilitated. The screw 48 may be suitably provided with a key grip 55, 56 in both ends so that it may be easily loosened, both if the tool holder is used in up or down turned position.

According to an alternative embodiment one part of the screw 48 may have right-hand threads and another part left-hand threads. One set of threads will then cooperate with a corresponding inner thread on the clamping device and the other set of threads with the hole in the holder shank. By means of this the clamping device may be loosened in an especially rapid manner. Suitably in this case there is allowed a certain play between outer and inner threads, especially in the threads for the clamping device in order that the clamping device will be pivoted somewhat upon the loosening of the screw.

In Figs. 9–11 the resilient device consists of a pressure body 57 and a spring 58. The movement range of the pressure body 57 is limited by means of a stop 60 cooperating with shoulder 59 of the holder shank.

Other embodiments of the resilient device will be satisfactory, of course, such as a flat spring, a bent flat spring or the like, arranged in a groove on the holder shank.

The invention naturally also relates to tool holders provided with a fixed clamp instead of a loosenable clamping device, and also where the tool bit might be arranged upon a support movable by means of a screw device or the like.

While in accordance with the provisions of the Patent Statutes I have illustrated and described the best form of embodiments of my invention known to me, it will be apparent to those skilled in the art that changes may be made in the form of the apapratus described without departing from the spirit of my invention as set forth in the appended claims.

I claim:

1. A tool holder comprising a substantially rectangular shank having top, side and end surfaces, the top, one side and one end surface of said holder having a unitary open recess therein at one corner of said holder shank, a tool bit positioned in said recess, a chip breaker positioned substantially completely at a level above and in contact with the upper surface of said holder shank and extending at least partially across the upper surface of said tool bit, loosenable clamping means secured to the upper surface of said holder shank for clamping said chip breaker downwardly into engagement with said tool bit to retain said bit in said holder shank recess, said clamping means including a substantially horizontal clamping member having a first recess in the lower surface thereof, a portion of said chip breaker extending into said clamping member recess, said clamping member having an opening therein longitudinally aligned with said chip breaker and on the opposite side of said clamping member therefrom, said opening extending through said clamping member to said recess so that tool means may be inserted therethrough to longitudinally adjust said chip breaker relative to said clamping member, and vertical spring means mounted in said holder shank beneath said chip breaker to continuously bias said chip breaker upwardly into engagement with said clamping member.

2. A tool holder comprising a substantially rectangular holder shank having top, side and end surfaces, said shank having a unitary open recess at one upper corner thereof, a tool bit positioned in said recess, a chip breaker positioned above and in contact with the upper surface of said holder shank and extending at least partially across the upper surface of said tool bit, loosenable clamping means secured to the upper surface of said holder shank for clamping said chip breaker downwardly into engagement with said tool bit to retain said bit in said holder shank recess, and vertical spring means mounted in said holder shank beneath said chip breaker to continuously bias said chip breaker upwardly into engagement with said clamping member.

3. A tool holder as defined in claim 2 wherein one wall of said holder shank unitary recess has a vertical groove therein, and further including a supporting plate in said holder shank unitary recess intermediate the bottom surface thereof and the bottom surface of said tool bit, said spring means comprising a pressure body slidably movable in said vertical groove and a spring intermediate said pressure body and the bottom of said vertical groove biasing said pressure member upwardly, said pressure member having a lateral projection thereon arranged to cooperate with the lower surface of said supporting plate to limit the upward extent of travel of said pressure body in said vertical groove.

4. A tool holder as defined in claim 2 wherein said clamping means comprises a substantially horizontal clamping member, a vertical screw extending through a bore in said horizontal clamping member and threadably engaging a screw-threaded bore in the upper surface of said holder shank, said screw having a head with a spherical under surface cooperating with a corresponding recess in the upper surface of said clamping member so that said clamping member is pivotally movable upwardly about said rounded head by the biasing force of the spring means upon said chip breaker upon loosening of said screw.

5. A tool holder as defined in claim 2 wherein said clamping means includes a substantially horizontal clamping member having at least one projection extending downwardly from the lower surface thereof and in removable engagement with a recess in the upper surface of said chip breaker to prevent lateral movement of said chip breaker relative to said clamping member.

References Cited in the file of this patent

UNITED STATES PATENTS

| | | |
|---|---|---|
| 1,776,335 | Rauziers | Sept. 23, 1930 |
| 1,779,059 | Burkart | Oct. 21, 1930 |
| 2,181,023 | Moore | Nov. 21, 1939 |
| 2,314,665 | Specht | Mar. 23, 1943 |
| 2,453,959 | Anthony | Nov. 16, 1948 |
| 2,623,272 | Greenleaf | Dec. 30, 1952 |
| 2,706,327 | Bodin | Apr. 19, 1955 |
| 2,808,637 | Hudson | Oct. 8, 1957 |

FOREIGN PATENTS

| | | |
|---|---|---|
| 169,435 | Great Britain | Aug. 31, 1922 |
| 704,143 | France | Feb. 13, 1931 |
| 750,032 | Germany | Dec. 13, 1944 |
| 932,962 | France | Dec. 17, 1947 |
| 1,041,370 | France | May 27, 1953 |

OTHER REFERENCES

Catalog "Throwaway Insert Holders," Valentite Metals Corp.

Royal Oak Mich. (Issued before ASTE Industrial Exposition of March 1956) pages 1 and 12 relied on.

"Three Russian Ideas," American Machinist, July 2, 1956 p. 96.